UNITED STATES PATENT OFFICE.

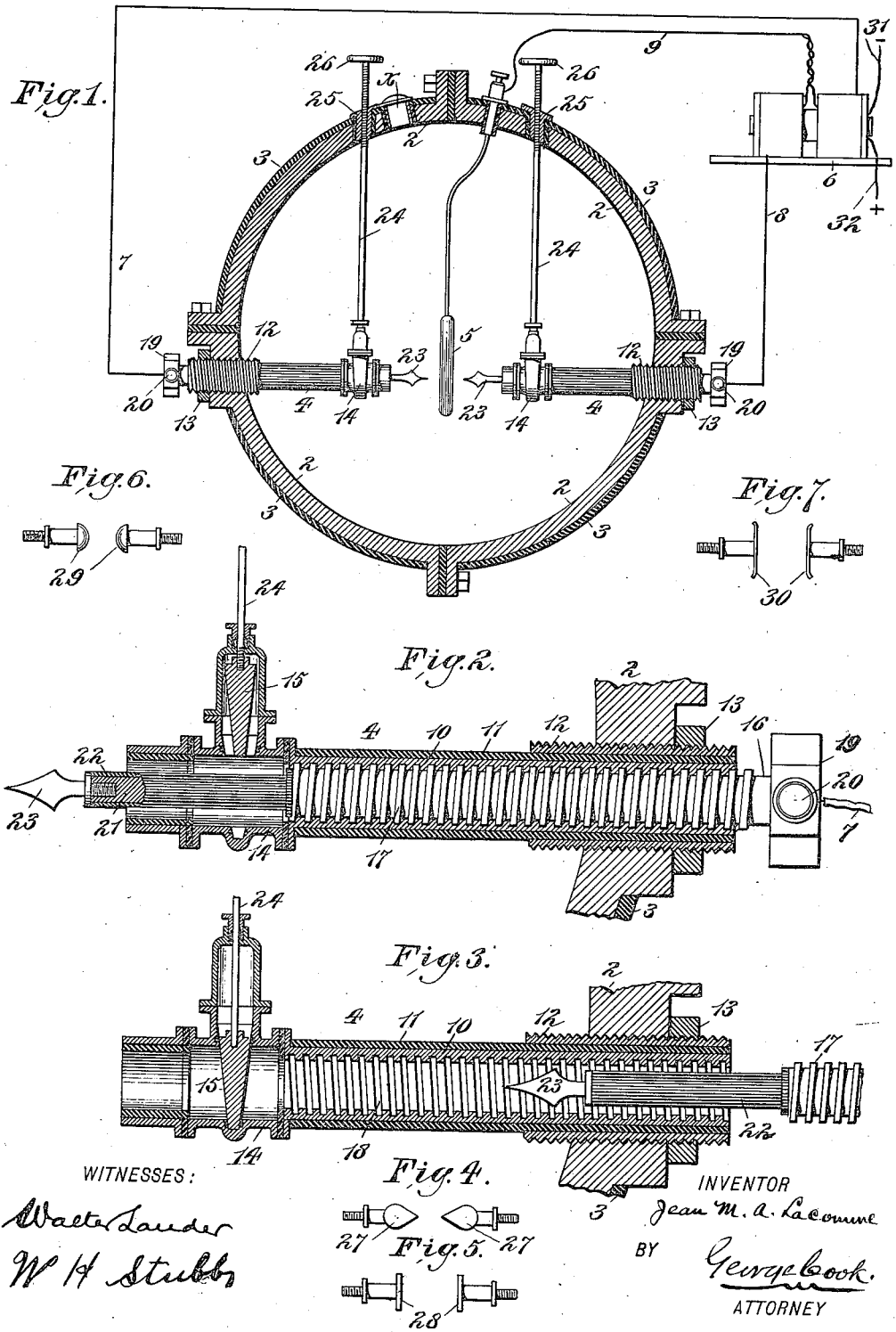

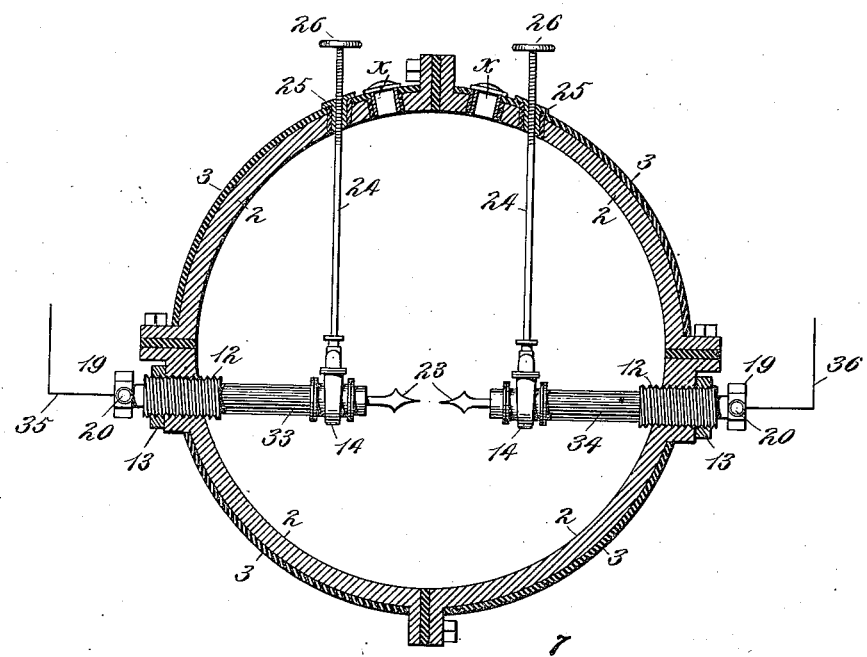
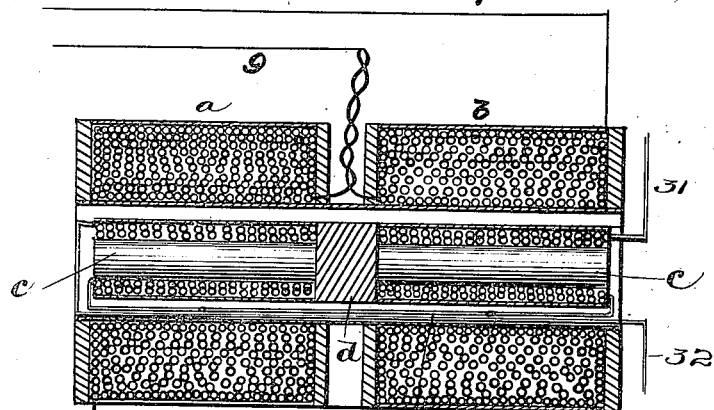

JEAN M. A. LACOMME, OF BROOKLYN, NEW YORK, ASSIGNOR, BY DIRECT AND MESNE ASSIGNMENTS, OF TWO-THIRDS TO WALTER LAUDER, OF BROOKLYN, NEW YORK, AND JAMES L. HACKETT, OF LOUISVILLE, KENTUCKY.

DEVICE FOR PURIFYING WATER.

SPECIFICATION forming part of Letters Patent No. 696,647, dated April 1, 1902.

Application filed October 24, 1901. Serial No. 79,797. (No model.)

*To all whom it may concern:*

Be it known that I, JEAN M. A. LACOMME, a citizen of the Republic of France, and a resident of New York, borough of Brooklyn, county of Kings, and State of New York, have made and invented certain new and useful Improvements in Devices for the Purification of Water, of which the following is a specification.

My invention relates to an improvement in devices for the purification of water, the object being to provide means whereby the rods employed for the production of electric sparks in and through water may be easily removed or inserted in place and properly adjusted without permitting the escape of the water during the operation.

In Letters Patent of the United States granted April 16, 1901, and numbered 672,231, I have shown and described a section of water-main so constructed and arranged that electric sparks may be passed through the water during the flow of the latter through the main, rods or electrodes connected with a suitable source of electric current being employed to effect the sparking. These sparking-rods, or at least the discharging ends thereof, in the course of time are disintegrated, fused, or partially destroyed by reason of the high-tension currents employed, so that it becomes necessary from time to time to change or renew them. To accomplish this without permitting the escape of water through the openings in the main provided for the passage of the sparking-rods, I have devised certain means hereinafter fully described and specifically claimed consisting of a tube or casing having provided near one end a valve and containing an adjustable rod or electrode the discharging end of which is removable, whereby said rod may first be partially removed from the tube or casing, the valve then closed, and the said rod finally completely removed. After a new discharge-point has been substituted for the old one the rod may then be partially inserted within the tube, the valve then opened, and the rod finally adjusted in its proper position.

A further object of the invention is to so arrange the electrodes that two sets or series of sparks may be effected, whereby the decomposition of the water to be treated may be more rapidly effected and the remaining portions thereof more thoroughly and quickly ozonized and oxygenized, and this I accomplish by employing three electrodes, the two outer ones being connected with like poles of a double sparking-coil, and the third or intermediate one being connected to the opposite poles of the coil.

In the accompanying drawings, Figure 1 is a sectional view of a water main or pipe having my improved device applied thereto. Fig. 2 is an enlarged view, partly in section and partly in elevation, showing the sparking-rod in its normal position within the tube or casing. Fig. 3 is a similar view showing the sparking-rod partially withdrawn from the tube, the valve being closed to prevent the escape of the water. Figs. 4, 5, 6, and 7 are views of modified forms of the removable sparking or discharging points of the electrodes. Fig. 8 is a view showing the use of but two electrodes, the third or intermediate electrode being omitted. Fig. 9 is a sectional view of the double sparking-coil.

Referring to the drawings, 2 represents a section of a water-main, the outer side or surface of which is covered with porcelain, hard rubber, kaolin, or any other suitable insulating material 3. Into this section of main and from opposite sides thereof project the sparking-electrodes 4 4, between the discharging ends of which is suspended a third or intermediate electrode 5, the electrodes 4 4 being, as hereinafter described, connected with the like poles of a double sparking-coil 6 by means of the wires or conductors 7 8 and the intermediate electrode 5 being connected to the opposite poles of said coil by means of the wire or conductor 9.

The electrodes 4 4 are similar in construction and arrangement, the details of which are illustrated in Figs. 2 and 3, wherein 10 represents a tube or pipe, preferably of metal and covered on its exterior surface with rubber, porcelain, or other suitable insulating material 11, the rear end thereof having fitted tightly thereto the sleeve 12, threaded in an opening formed in the pipe 2 to receive the same, a lock-nut 13 being threaded onto said sleeve and adapted to impinge against the outer surface of said pipe 2 for locking the tube in its proper position. In the tube or pipe 10 and preferably near its inner free end is inserted a section 14, containing the gate-valve 15, whereby during the withdrawal or insertion of the electrode proper the water may be prevented from passing out of the main through the tube 10, as hereinafter described.

Within the tube 10 is contained the electrode proper, 16, threaded for the greater portion of its length, as illustrated at 17, to engage with corresponding threads 18, formed on the inner side or surface of the tube, the outer extreme end of the electrode being preferably squared in order to facilitate the turning thereof when desiring to horizontally adjust it. To this squared end 19 is secured a binding-post 20, from which leads the wire or conductor 7 to one pole of the sparking-coil 6. The inner free end 21 of the electrode 16 is preferably reduced in diameter and protected with rubber, porcelain, or other suitable insulating material 22, the extreme end or discharging-point 23 being threaded into the reduced end 22 in order that said point may be removed when desired and a new one substituted.

To the valve 15 is secured the valve-rod 24, which extends upwardly through a sleeve 25, threaded into the main 2, the rod being threaded in said sleeve and provided on its outer extreme end with the wheel or handle 26, whereby the same may be turned to raise or lower said gate-valve 15.

From the foregoing description it will be understood that when it is desired to repair or renew the discharging end or point 23 of the electrode it is simply necessary to turn the outer squared end 19 until said extreme end or point 23 is drawn outwardly to a point beyond the gate-valve. The valve-rod 24 is then properly turned to lower the gate 15, which effectually closes the inner end of the tube 10 and prevents the escape of the water from the main out through said tube. The valve being closed, the electrode may then be entirely removed from its containing-tube and the discharging-point 23 removed and a new one substituted. The electrode is then replaced within the tube and screwed inwardly a sufficient distance to prevent the escape of any water through said tube, whereupon the valve may be raised or opened by means of the rod 24 and the electrode finally adjusted to its proper position, as may be seen through the manhole X.

The removable discharging points or ends may be made of any desired shape and material in accordance with the object to be attained—as, for instance, if it be desired to effect a rapid treatment of the water the several electrodes will be so adjusted that they will come into close proximity—that is, the positives with the negative—the result being a continuous spark or series of sparks. If, on the other hand, it is desired that the treatment proceed more slowly, the electrodes will be adjusted at a greater distance from each other, whereby the current will pass from one to the other without the sparking effect.

In Figs. 1, 2, 3, and 8 I have shown the removable discharging ends 23 provided with sharp points, this shape being especially desirable to produce a continuous sparking effect and are preferably formed of platinum or an alloy of platinum and iridium.

In Fig. 4 I have shown the removable ends 27 of a somewhat different shape and preferably formed of wrought-iron.

Fig. 5 shows the removable ends 28 in the form of disks, such shape being highly effective when the discharging ends are formed of pure carbon or carbon mixed with graphite.

Fig. 6 shows the removable ends 29 of such shape as may be utilized when a slow treatment of the water is desired, the extreme rounded ends presenting comparatively large surfaces. In this form they are preferably constructed of wrought-iron.

In Fig. 7 also the ends 30 present large surfaces, the extreme discharging ends being in the form of disks, and preferably made of alloyed platinum.

It will of course be understood that I do not limit my invention to the use of any particular metals or alloys in the formation of the removable discharging ends of the electrodes, it, however, being highly essential that the alloys be homogeneous in texture and that such be employed as will withstand the high degree of heat to which they are necessarily raised when the current of electricity passes through them.

In Figs. 1 and 9 is shown a sparking-coil 6, electrically connected with the electrodes 4 5 and of a pattern or style wherein two like poles of the two secondary coils are joined and lead the current through the wire or conductor 9 to the intermediate electrode 5 and wherein one pole of one secondary coil is connected by means of the wire or conductor 7 to one of the outer electrodes 4 and the like pole of the other secondary coil connected with the other electrode 4 by the wire or conductor 8, the poles of the primary coil being connected by means of the wires or conductors 31 32 to any suitable source of electricity. This coil is preferably constructed with the core c, divided at about its center with the insulating material d, the ends of the primary wires 31 32 being connected by the bridge-piece e, the opposite ends being connected, as before described, to any suitable source of electricity. The vibrator for making and breaking the circuit in the primary coil has been omitted, as the construction and operation of the same are well understood by those skilled in the art. By reason of this construction and arrangement of parts it will be understood that when the device is in operation the induced currents of electricity from the coil 6 will pass through the electrodes 4 of like polarity into the intermediate electrode 5 of opposite polarity, the circuit being completed through the water, whereby a portion of the latter will be decomposed and the remaining portions ozonized and oxygenized, the rapidity of the decomposition and its resulting effects depending largely, as heretofore stated, upon the adjustment of the electrodes toward or away from each other. It will be further understood that by arranging the intermediate electrode of opposite polarity to two outer ones I largely increase the effectiveness of the device, although it is possible to use but two electrodes, as illustrated in Fig. 8. In such instance the electrodes 33 34, constructed and arranged as the electrodes 4 4, will be connected to the opposite poles of an ordinary sparking-coil by means of the wires or conductors 35 36, the current of electricity flowing from one discharging end 23 to the other, the circuit being completed by the water between them.

Having fully described my invention, what I claim as new, and desire to secure by Letters Patent, is—

1. The combination with two outer electrodes of the same polarity, of a third or intermediate electrode of opposite polarity, a double sparking-coil, two like poles of the secondary coils of which are electrically connected to said intermediate electrode, and the other poles to the two outer electrodes, the primary coil being connected with a suitable source of electricity, substantially as described.

2. In a device for the purification of water, the combination with a pipe or main having openings therein, of electrodes fitting in said openings and connected with a suitable source of electricity, and means for closing the openings in said main during the insertion or withdrawal of said electrodes, substantially as described.

3. In a device for the purification of water, the combination with a pipe or main, of tubes fitted in openings in said main and extending inwardly into the latter, electrodes removably held in said tubes and connected with a suitable source of electricity, and valves connected with said tubes for closing the same during the insertion or withdrawal of said electrodes, substantially as described.

4. In a device for the purification of water, the combination with a pipe or main, of tubes fitting in openings in said main and extending inwardly into the latter, electrodes adjustably contained within said tubes and having removable discharging points or ends, said electrodes being connected with a suitable source of electricity, and valves connected with said tubes whereby the latter may be closed during the insertion or withdrawal of said electrodes, substantially as described.

5. In a device for the purification of water, the combination with a pipe or main, of tubes fitting in openings in said main and extending inwardly into the latter, electrodes threaded into said tubes, and provided with removable discharging points or ends, said electrodes being connected with any suitable source of electricity, gate-valves located in said tubes and having valve-rods extending outwardly through said main whereby said tubes may be closed against the escape of water from said main during the insertion or withdrawal of said electrodes, substantially as described.

Signed at New York, in the county of New York and State of New York, this 23d day of October, A. D. 1901.

JEAN M. A. LACOMME.

Witnesses:
GEORGE COOK,
M. VAN NORTWICK.